United States Patent [19]

Creed et al.

[11] 3,771,574

[45] Nov. 13, 1973

[54] TRANSITION PATH FOR FILLING MACHINE

[75] Inventors: Sherman H. Creed, San Jose; John R. Huber, Los Gatos; Johan Hendriks, San Jose, all of Calif.

[73] Assignee: FMC Corporation, San Jose, Calif.

[22] Filed: Dec. 16, 1971

[21] Appl. No.: 208,598

[52] U.S. Cl. .................................... 141/1, 141/144

[51] Int. Cl. ............................ B65b 1/04, B65b 3/04

[58] Field of Search .................... 141/370, 373, 144, 141/145, 164, 168, 176, 272, 281; 198/22, 25, 33 A; 221/157 A

[56] References Cited

UNITED STATES PATENTS 3,656,605 3/1972 Gess ................................ 198/33 AA

*Primary Examiner*—Houston S. Bell, Jr.
*Attorney*—F. W. Anderson et al.

[57] ABSTRACT

This invention relates to filling of open top containers, such as cans, on rotary fillers and more specifically to what will be termed an improved transition path between the rotary path of the filler and a straight line discharge path for the filled containers. Both a constant curvature decrease spiral and a parabolic type curve are disclosed.

14 Claims, 15 Drawing Figures

INVENTORS
SHERMAN H. CREED
JOHN R. HUBER
JOHAN HENDRIKS

BY F. W. Anderson
C. E. Tripp
ATTORNEYS

11 Sheets-Sheet 2

FIG_10

PARABOLIC TRANSITION PATHS

| CURVE NO. | INITIAL RADIUS | TOTAL OFFSET | OFFSET AT 270° | ANGLE START OF CURVE | DISTANCE 270° TO .010 FROM TANGENT POINT | RADIUS AT POINT X, Y | FORMULA OF CURVE |
|---|---|---|---|---|---|---|---|
| | R | d | $d_1$ | Θ | $X_t$ | $R_{x,y}$ | $y = a x^n$ |
| 1 44 POCK. | 22.06265 | .875 | .359 | 30° | 12.476 | 572.7251 | $y=7.608857\times10^{-8} x^{5.05}$ |
| 2 44 POCK. | 22.06262 | 1.000 | .4228 | 30.8333° | 14.692 | 752.73542 | $y=2.120450\times10^{-9} x^{5.797}$ |
| 3 20 POCK. | 19.1257 | 1.000 | .358 | 31.82343° | 15.31752 | 906.1538 | $y=1.00678\times10^{-11} x^{7.03}$ |
| 4 20 POCK. | 19.000 | 1.000 | .394 | 31.86424° | 15.103 | 856.266 | $y=8.112747\times10^{-12} x^{7.1}$ |
| 5 20 POCK. | 19.250 | 1.000 | .381 | 31.77838° | 14.9892 | 829.806 | $y=1.531152\times10^{-11} x^{6.955}$ |
| 6 20 POCK. | 19.125 | .500 | .2361 | 27.52539° | 6.008 | 179.780 | $y=3.613392\times10^{-5} x^{3.7834}$ |
| 7 20 POCK. | 19.000 | .750 | .3361 | 30.03906° | 10.2038 | 413.868 | $y=1.536518\times10^{-7} x^{5.0286}$ |
| 8 20 POCK. | 19.000 | .500 | .238 | 25.56425° | 6.029 | 181.404 | $y=3.483391\times10^{-5} x^{3.7964}$ |
| 9 20 POCK. | 19.125 | .750 | .327 | 29.9985° | 10.118 | 401.545 | $y=1.712686\times10^{-7} x^{4.999}$ |

FIG_10A

PARABOLIC TRANSITION PATHS

| CURVE NO. | INITIAL RADIUS | TOTAL OFFSET | OFFSET AT 270° | ANGLE START OF CURVE | DISTANCE 270° TO .010 FROM TANGENT POINT | RADUIS AT POINT x,y | FORMULA OF CURVE |
|---|---|---|---|---|---|---|---|
| | R | d | $d_1$ | Θ | $X_t$ | $R_{x,y}$ | $y = a x^n$ |
| 10 28 POCK. | 24.510 | .500 | .243 | 26.0766° | 6.406 | 205.799 | $y = 1.074121 \times 10^{-4} x^{3.3791}$ |
| 11 28 POCK. | 24.510 | .750 | .366 | 28.470° | 10.185 | 391.055 | $y = 3.564495 \times 10^{-6} x^{4.1421}$ |
| 12 28 POCK. | 24.510 | .875 | .378 | 29.414° | 12.009 | 488.002 | $y = 3.894633 \times 10^{-7} x^{4.618}$ |
| 13 28 POCK. | 24.510 | 1.000 | .411 | 30.25° | 14.231 | 653.097 | $y = 2.563689 \times 10^{-8} x^{5.187}$ |
| 14 28 POCK. | 24.510 | 1.250 | .481 | 31.66° | 19.364 | 1187.283 | $y = 9.683981 \times 10^{-12} x^{6.7645}$ |
| 15 28 POCK. | 24.510 | 1.500 | .538 | 32.83° | 25.254 | 2064.825 | $y = 5.246698 \times 10^{-18} x^{9.4779}$ |

TABLE I

MAX. RATE OF CHANGE OF CURVATURE

| CURVE NO. | PARABOLIC-T1 | SPIRAL-T | RATIO PARABOLIC-T1 / SPIRAL |
|---|---|---|---|
| 1. | 0.002966 | 0.002105 | 1.41 |
| 2. | 0.002920 | 0.001970 | 1.48 |
| 3. | 0.003827 | 0.002440 | 1.57 |
| 4. | 0.003870 | 0.002464 | 1.57 |
| 5. | 0.003780 | 0.002417 | 1.56 |
| 6. | 0.004222 | 0.003451 | 1.22 |
| 7. | 0.004003 | 0.002846 | 1.41 |
| 8. | 0.004272 | 0.003485 | 1.23 |
| 9. | 0.003954 | 0.002818 | 1.40 |
| 10. | 0.002726 | 0.002379 | 1.15 |
| 11. | 0.002497 | 0.001492 | 1.29 |
| 12. | 0.002438 | 0.001798 | 1.36 |
| 13. | 0.002396 | 0.001682 | 1.42 |
| 14. | 0.002336 | 0.001504 | 1.55 |
| 15. | 0.002298 | 0.001373 | 1.67 |

TRANSITION PATH FOR FILLING MACHINE

REFERENCE TO RELATED APPLICATIONS

The copending United States application of Gallatley et al., Ser. No. 218,111 filed Jan. 17, 1972, assigned to the FMC Corporation is directed to an automatic track banking mechanism which can be utilized in association with the present invention.

DESCRIPTION OF PRIOR ART

The U.S. Pat. to Hurtig No. 3,105,526, Oct. 1, 1963, discloses a rotary filler of the type to which this invention relates and employs a transition path formed of two circular arcs of successively increasing radaii of curvature.

The U.S. Pat. to Minard et al. No. 3,421,555, Jan. 14, 1969, discloses a short transition path between a circular path filling machine and a straight line discharge path without describing the geometry of the transition path.

The U.S. Pat. to Krueger No. 2,454,285, Nov. 23, 1948, discloses a container feeder for filled containers wherein a head space is created by tamping out some of the liquid in the containers. A guide, described as a spiral, forms the entire path for the containers as they are moved about a center of rotation between a feed wheel and a straight line discharge path.

The U.S. Pat. to Nordquist No. 2,007,981, July 16, 1935, shows a can feeding device for containers that have been previously filled which has cam operated fillers that transfer the containers between the star wheels over a noncircular path, the geometry of which is not described.

The U.S. Pat. to Banks No. 3,160,240, Jan. 5, 1965, shows a transfer conveyor for a paper machine that moves sheets of paper from a circular path to a straight line path without describing details of any transition path, if present.

The use of constant curvature spiral railroad tracks between a circular curve and a straight length of track is described in "Route Surveys Construction" by Rubey, Macmillan Company, New York, and in the "Standard Handbook For Civil Engineers" by Merrit, McGrow-Hill Book Company, New York.

SUMMARY OF THE INVENTION

The improvement represented by the present invention will be discussed in connection with the filling of open top containers, such as tin cans, with liquid or semi-liquid product. However, it is to be understood that other types of containers can be processed under the present invention.

Modern canneries seek fillers that operate at higher and higher speeds and filling speeds as high as 600 800 and even 1,500 cans per minute are in demand. In this regard, it must be remembered that Government regulations, for a given size container, determine the predetermined maximum head space in the container in order that the filled container will be up to weight. It is the head space which provides the factor of safety against spillage during the filling operation on rotary fillers and since the head space cannot be increased to provide an increase in the speed of operation, the problem is to take optimum advantage of the available head space while increasing the filling speed.

Applicants have found, in their quest for higher filling speeds, that filled or even partially filled containers are unexpectedly sensitive to the effect of any abrupt change in the radius of curvature of the filling path as the containers pass in the generally circular path around the filler to a straight line discharge path. Thus, for example, the original filler designs wherein the straight discharge paths were merely tangent to the basic circular path of the filler are completely unacceptable in high speed operations, because at the point of tangency there is an abrupt change of curvature from that of a finite radius to that of an infinite radius. Machines of this type are completely unacceptable for the purposes described, because the abrupt change in curvature results in excessive movement of the liquid surface and spill results.

The aforesaid United States patent to Hurtig represents a step in the right direction in that the straight line discharge path is offset from the circular filling path and two successive, tangent radii of curvatures are combined to provide a transition path that is tangent to the circular path and to the straight line discharge path. However, the deficiencies of this principle will be described briefly in some detail in order to point out the importance and significance of the transition path of the present invention, which overcomes such deficiencies.

Effects of Abrupt Increases in Radius of Curvature of Path

Before discussing specifically the effects of abrupt increase in the radius of curvature of the transition path from a circle to a straight line it must be decided whether we wish to describe a filler wherein the banking around the circular path of the filler is held down to a value wherein there would be no spillage when the filler is stopped. This would not permit a very high speed operation. Speed can be increased greatly if either spillage is accepted on stopping the filler, or if some means is provided to reduce the banking on stopping, as in the aforementioned copending United States application of Gellatley et al. This description will assume that the degree of banking is not to be restricted by conditions that exist when the filler is stopped, namely the banking can be optimized for the particular radius of curvature at any point along the filling and transition paths. At high speed operation it has been found that abrupt changes in radius of the path of the cans is unacceptable, even though they appear to be very small changes, (as in the case of tangent circular patterns of discrete increases in radius).

The results are particularly bad on an abrupt (as opposed to a gradual) change in radius from a small radius to a larger radius. This abrupt transition in passing from one radius to a somewhat larger radius, suddenly reduces the centrifugal force on the contents of the can. When this occurs, the force of gravity (against which the centrifugal force was acting) immediately urges the liquid back toward a new and more horizontal level. Once this level-seeking process begins, and due to the momentum of the liquid, the re-leveling action continues, even after the liquid reaches its new, and theoretical stable level. Thus the liquid continues moving toward a level that is more horizontal than that representing the theoretical response to the newly reduced centrifugal force, and more specifically the height of the liquid at the inside (the low side) of a banked can will rise past the assumed value. This "wave action" can cause spillage over the inside rim, on cans filled and banked for maximum speed operation. Also, the liquid wave action on return toward the new level causes overtravel in the other direction with spillage over the outer lip, despite the banking. Furthermore, although the new and larger radius of curvature is constant, the banking must be steadily decreased along the new radius to avoid the need for abruptly reducing banking later, before the cans are leveled in the straight path to the capper. This necessary decrease in banking the cans causes difficulties on the aforesaid return wave, in that outside rim spillage developed. These are major defects in the multi-circular arc type of discharge path.

The general considerations related to how the transition path of the present invention solves the aforesaid problems are as follows:

1. The transition path cannot have any abrupt (or even rapid) changes of curvature either at its junction with the circular filling path, with the straight line discharge path, or in between.

2. The transition path should be long, consistant with the permissible "offset" between the straight discharge path and the filling path or circle. The term "offset" refers to the difference between the length of a line that is perpendicular to the rearward extension of said straight discharge path and extends from the center of the filling circle to the path extension and the radius of the filling path circle. Of course, if there were no limitation on the amount of the aforesaid offset, the transition path could be made almost any length but there are limitations in that filled cans must be physically transferred (without jarring) from the filler circle to the transition path, and from the transition path to the straight line path. An overly large offset presents physical transfer problems that cannot be solved with present type equipment. These transfer problems are presented by the need for smoothly picking up the filled containers from the filler pockets by means of synchronized fingers on the discharge conveyor. Thus, one of the problems solved by the present invention is to produce a smooth transition curve at all points along its length which gradually reduces the effect of centrifugal force on the cans without requiring an unacceptably large offset and in fact, the offsets required are relatively small.

3. Another advantage of providing a long transition path curve with an acceptably small offset, without any zones of rapid change in curvature, and without any abrupt changes in the radius of curvature, are that the long path provides a greater distance over which the banking angle imparted to the cans during filling can be progressively removed thereby further ensuring the smooth operation and lack of wave action essential to high speed filling.

It has been surprisingly difficult to develop a transition curve that meets the above requirements for utilization in a high speed, practical filler of current design. Two type of curves are disclosed herein. One of these curves may be characterized generally as a constant curvature decrease spiral, having a lead-in portion with a radius of curvature equal to that of the circular filler path and terminating in an infinite radius of curvature portion that is tangent to the discharge path, while complying with the conditions outlined above.

The other curve can be characterized as a "parabolic" curve of the type $y = ax^n$, wherein the exponent is greater than three, and having a minimum radius of curvature equal to that of the circular discharge path and terminating at the straight line discharge path in a portion that has a radius of curvature that is so large, that in terms of the action on the liquid it is equivalent to an infinite radius of curvature. Both of these curves, as designed under the present invention, meet the conditions outlined above. They provide a long enough transition path without abrupt or even rapid changes in curvature and they also provide adequate time over which the banking imparted to the containers on the circular filling path can be removed without spillage.

DETAILED DESCRIPTION OF THE DRAWINGS

FIGS. 10 and 10A are charts giving design details of a number of parabolic type transition curves for various filler configurations.

DETAILED DESCRIPTION

Typical Filler Construction

Figure 1:
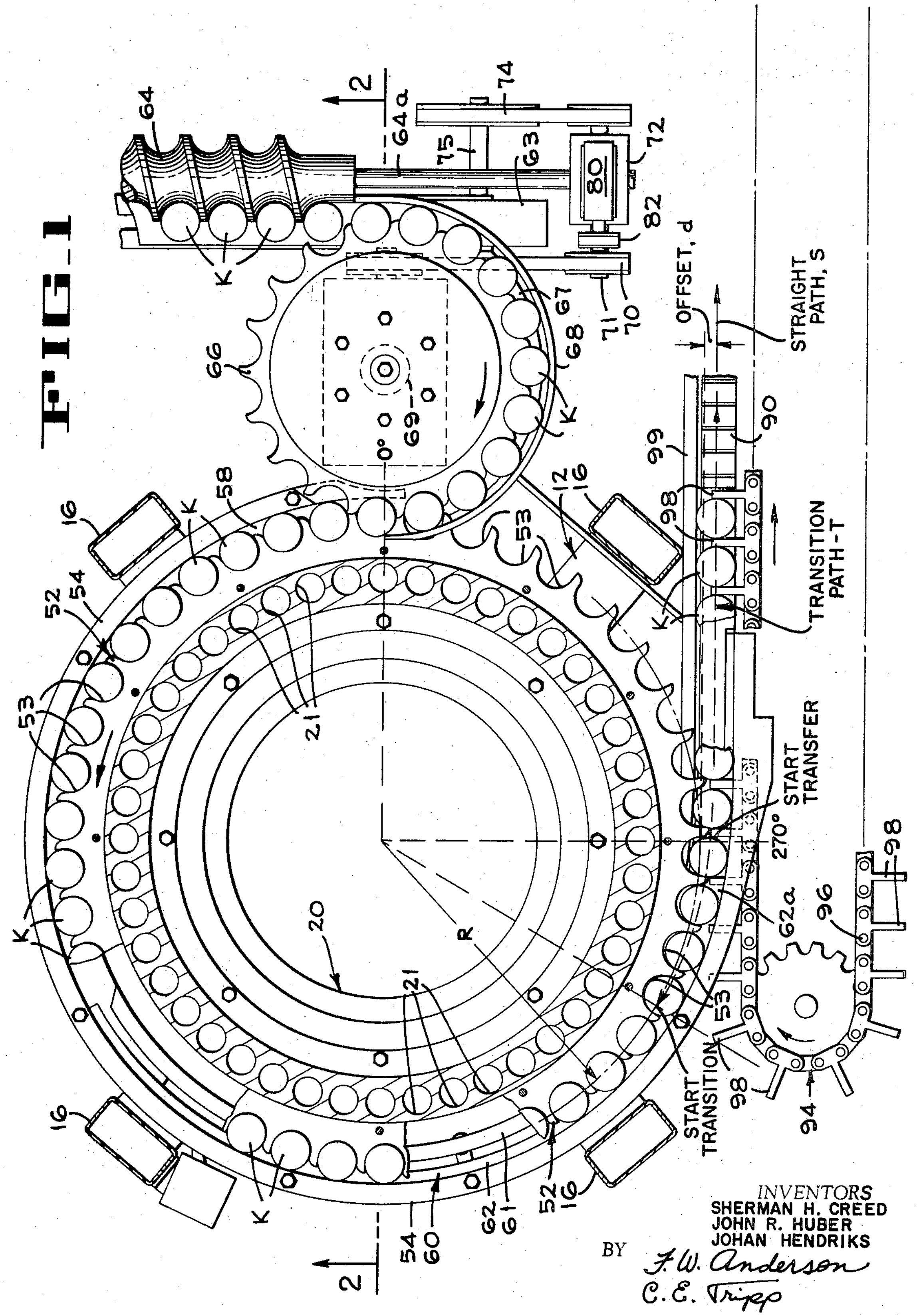
FIG. 1 is a plan section of a rotary filler embodying the invention and showing the transition mechanism essential for smooth transition from the circular filling path to the transition path and on to the straight line discharge path.
Figure 2:
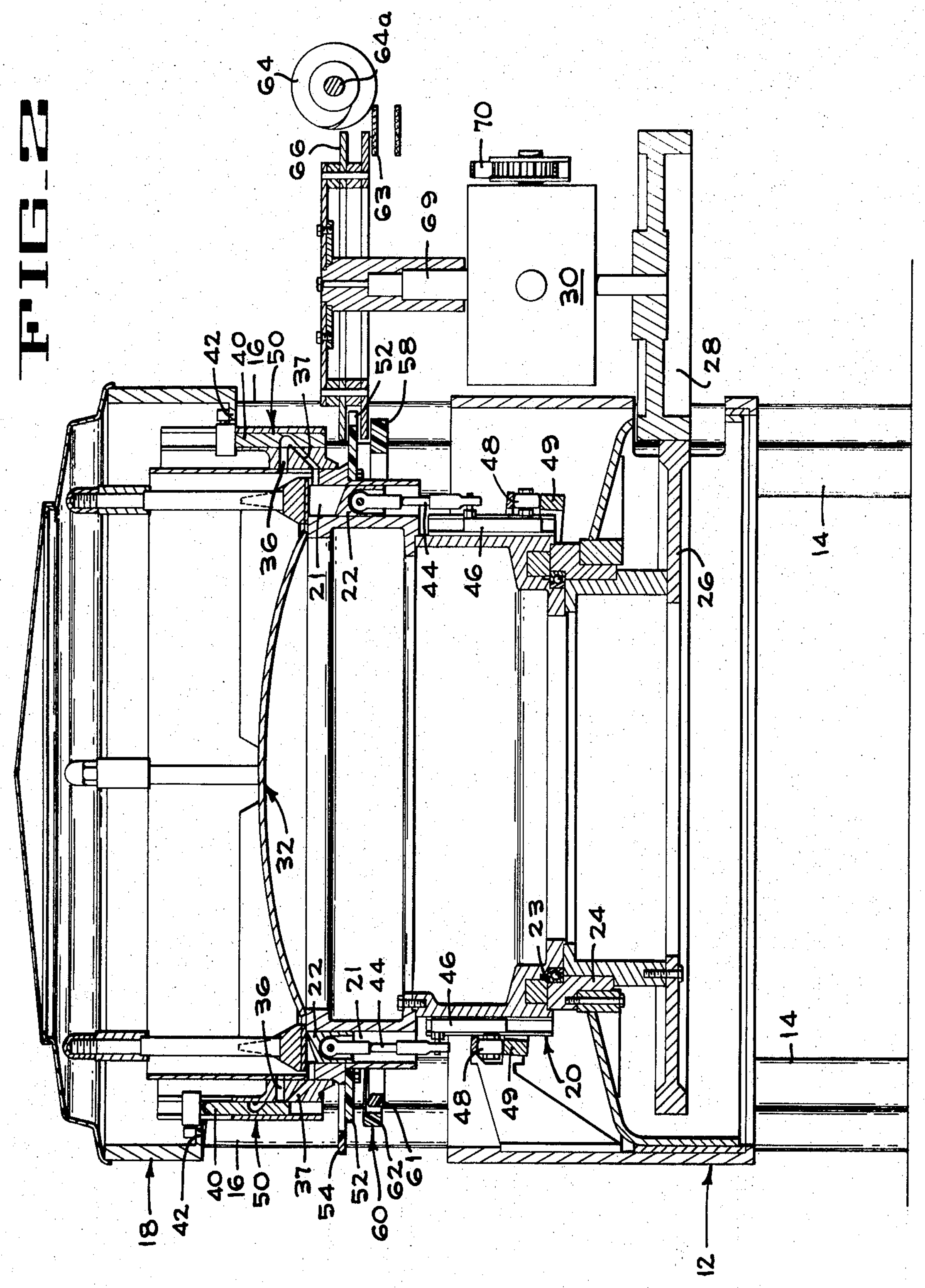
FIG. 2 is a central section taken along line 2—2 of FIG. 1 showing a typical filler embodying the invention.
Figures 3, 4, 5, 5A, 5B:
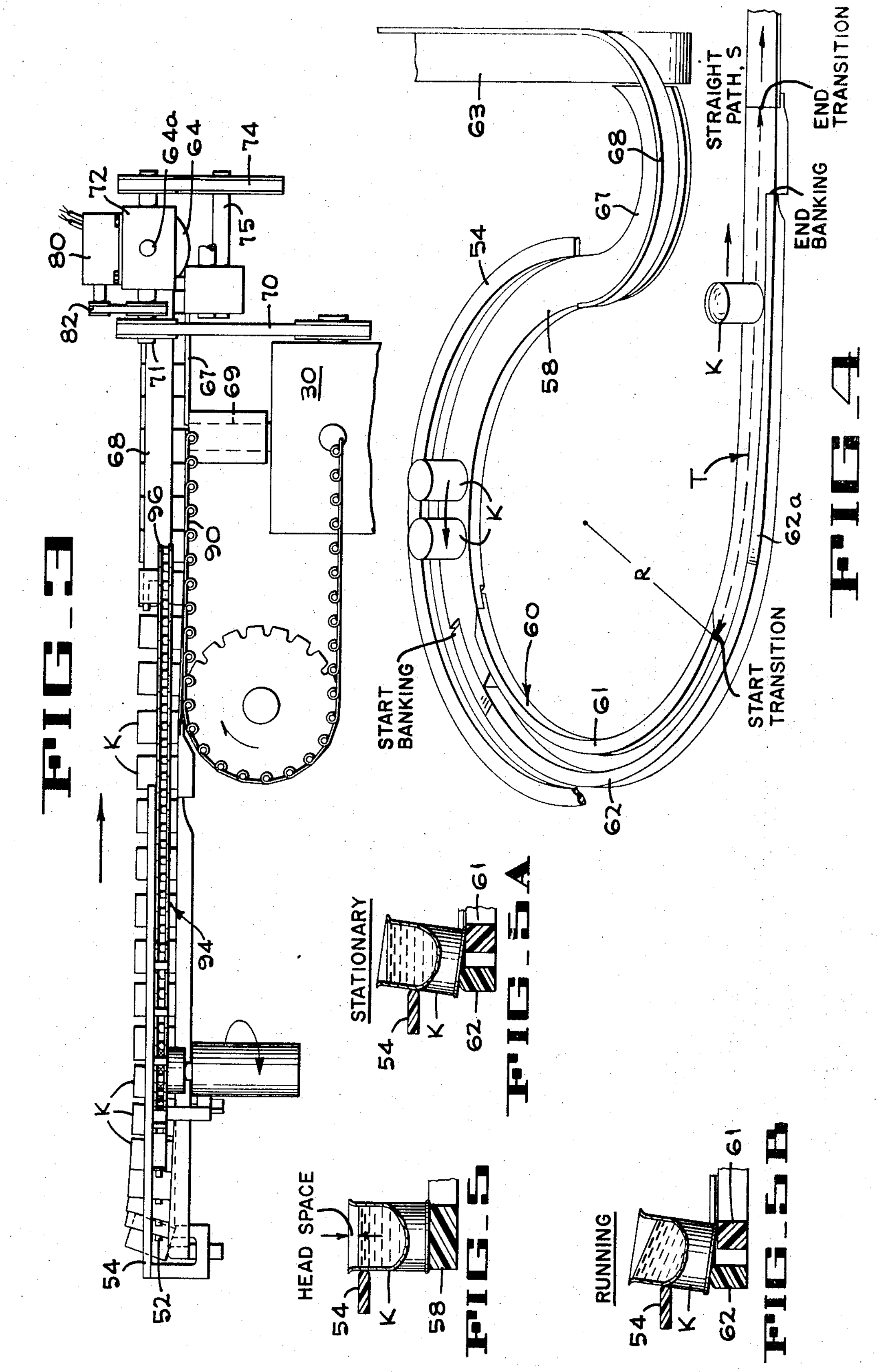
FIG. 3 is a side elevation of the discharge portion of the apparatus.
FIG. 4 is a diagrammatic perspective of the path of articles through the apparatus.
FIGS. 5 to 5B show various operating conditions relative to containers.

A rotary filler embodying the transition path feature of the present invention is shown in FIGS. 1 – 3. It is to be understood that the filler is of a type well known in the art and manufactured by the assignee of the present invention. The details of the pistons, valves, cams and other mechanisms of the filler are thus of conventional design and are not critical to the present invention. Furthermore, the filler illustrated is of the same general type as that shown in the U.S. Pat. to Kerr No. 2,958,346, Nov. 1, 1960 and the operation of the pistons valves, etc. involved are described in detail in that patent.

The filler to be described includes a general reference to structure for automatically removing the container banking when the machine is not running so that a banking angle can be applied during running which might result in spillage if that angle remained when the machine is stopped. However, this feature forms the subject matter of the aforesaid copending United States application of Gellatley et al. The aforesaid automatic banking feature need not be employed in a filler embodying the present invention, but merely represents a desirable feature of the filler.

The filler embodying the present invention has a frame structure indicated generally at 12 (FIG. 1) and supported by legs 14. Posts 16, which may be extensions of the legs 14 support upper framework 18 (FIG. 2). A rotatable filling turret 20 embodies a circular array of filling cylinders 21 and pistons 22 such as those shown in the aforesaid United States patent to Kerr. The filling turret is mounted by a bearing structure indicated generally at 23 on an annular frame ring 24 (FIG. 2), it being understood that these details are not critical to the present invention.

The turret 20 is driven by a large gear 26 connected to the bottom of the turret which in turn is rotated by a smaller gear 28 driven by a drive motor and gear box unit 30. The filler turret incorporates a bowl indicated generally at 32 which communicates with the measuring cylinders 21 by means of valved ports indicated generally at 36, at the right side of FIG. 2. Vertically reciprocating valve members 40 which control the ports 36 are operated by stationary cam mechanism 42 in accordance with conventional design. Ports 37, at the left of FIG. 2, are valved to connect the cylinders 21 of the pistons 22 to filler nozzles 50.

The pistons 22 are connected by links 44 to slides 46 which have cam rollers 48 which ride over a fixed cam 49 for raising and lowering the pistons 22 in accordance with conventional principles of machines of this type. When the pistons 21 are lowered, as seen at the right of FIG. 2, the product is drawn from the bowl 32 through the valve ports 36 and into the cylinders 21. When the pistons are raised as seen at the left of FIG. 2, the product is discharged through the opened ports 37 and out through filler nozzles 50 which at this time will be disposed over cans supported on the track mechanism of the present invention, as will be explained presently.

The cans K (not shown in FIG. 2) are advanced around the filler beneath the nozzles 50 by means of a large pocket wheel 52 (FIG. 1) which provides a pocket 53 for each can. The filler being described is a 44-pocket filler. An outer guide rail 54 surrounds about 270° of the filler and extends along a discharge path. A can track supports the cans or other containers from their bottoms beneath the nozzles 50 and within the guard rail 54. Such tracks are known in the art and the lead in portion 58 of the track is shown in FIGS. 1 and 2. As is conventional in the art, the shape of the guide rail 54, due to the action of centrifugal force on the containers K, inherently determines the path taken by the containers so long as the guide rail is curved.

For high speed operation, the track has a banking section designated generally at 60, having an inner rail 61 and an outer rail 62. The outer rail can be at a fixed banking angle, can be adjustable, or can be connected to an automatic mechanism as described in the copending application. In either case, the track 62 is contoured so that the section 62*a*, starting from the beginning of the transition path of the present invention provides a progressively decreasing banking angle. The transition path of the present invention is indicated generally at T (FIG. 4), and is tangent to a substantially circular filling path having radius R in the filler, and a straight discharge path S, offset from a tangent to the filler radius R by a distance *d* (FIG. 1). The circular path need not be a geometrically perfect circle, so long as there are no rapid or even mildly rapid changes in its radius R. Of course the pockets 53 and the filler nozzles 50 move in a true circle because they form part of the rotating turret 20, whereas the radius R of the filling path of the containers K is determined by the exact shape of the curved portions of the guide rail 54, due to the action of centrifugal force on the containers.

Other features of a filler useful in the present relate to the feeding and discharging of cans. As seen in FIGS. 1 and 2 a delivery conveyor 63 operating in conjunction with a feed worm 64, feeds cans to a star wheel 66 which is rotated in synchronism with the filler pocket wheel 52, which carries cans around a curved track 67 and guide rail 68, (FIG. 4) and deposits them in the pockets 53 of the turret 20 (FIG. 1). The star wheel 66 is driven from a vertical shaft 69 (FIG. 2) on the drive motor and gear box 30 previously described in connection with the gear 28 that rotates the filler turret 20. The drive unit 30 operates a belt and pulley assembly 70 which drives a shaft 71 for an accessory gear box 72. The gear box 72 drives the shaft 64*a* for the feed screw 64 previously described. The gear box drive shaft 71 also drives the feed conveyor 62 by means of the belt and pulley arrangement 74, that turns a conveyor drive roll on the pulley shaft 75. The details of this feed conveyor drive are not critical to the present invention.

If automatic removal and reintroduction of the banking of the outer rail 62 is desired, a tachometer 80 is mounted on the gear box 72 and is driven from the gear box drive shaft 71 by a belt and pulley construction 82 (FIG. 3). The tachometer 80 provides electrical signals where voltage is proportional to the speed of rotation of the filler turret 20, which signals are utilized in order to operate the automatic banking elements of the track section 60 in a manner described in detail in the aforesaid pending application.

After the cans have been filled from the nozzles 50 they are conveyed around the aforesaid transition portion of the can track illustrated generally at T (FIGS. 1 and 4) which leads to the straight path S along an offset straight line discharge conveyor 90 (FIGS. 1 and 3).

Transfer of the cans from the transition path T to the discharge conveyor 90 is assisted by a transfer conveyor 94 that runs parallel to the discharge conveyor 90, (FIGS. 1 and 3). The discharge conveyor 94 comprises a chain 96 having fingers 98 that form can pockets, which as best seen in FIG. 1 cooperate with the pockets 53 in the pocket wheel 52 so that the cans are smoothly removed from the filler and directed to the discharge conveyor 90, at about 270° of rotation from the 0° point, where the cans are introduced into the filler by the feed wheel 66 (FIG. 1). A discharge guide rail 99 on the inside of the transition path T, urges the cans away from the pocket wheel 52 and into the pockets formed by the fingers 98 of the transfer conveyor 94. The discharge conveyor 90 leads the filled containers to a capping machine (not shown) in accordance with conventional practice. It is apparent that the discharge conveyor 90 and the transfer conveyor 94 should be synchronized with the pocket wheel 52 in the system illustrated. Hence, conveyors 90 and 94 are operated (by means not shown) from the capping machine and the capping machine is driven in synchronism with or is driven by the filler drive unit 30 in accordance with conventional practice and by drive means not illustrated.

Comparison of Three Transition Paths

Figure 6:
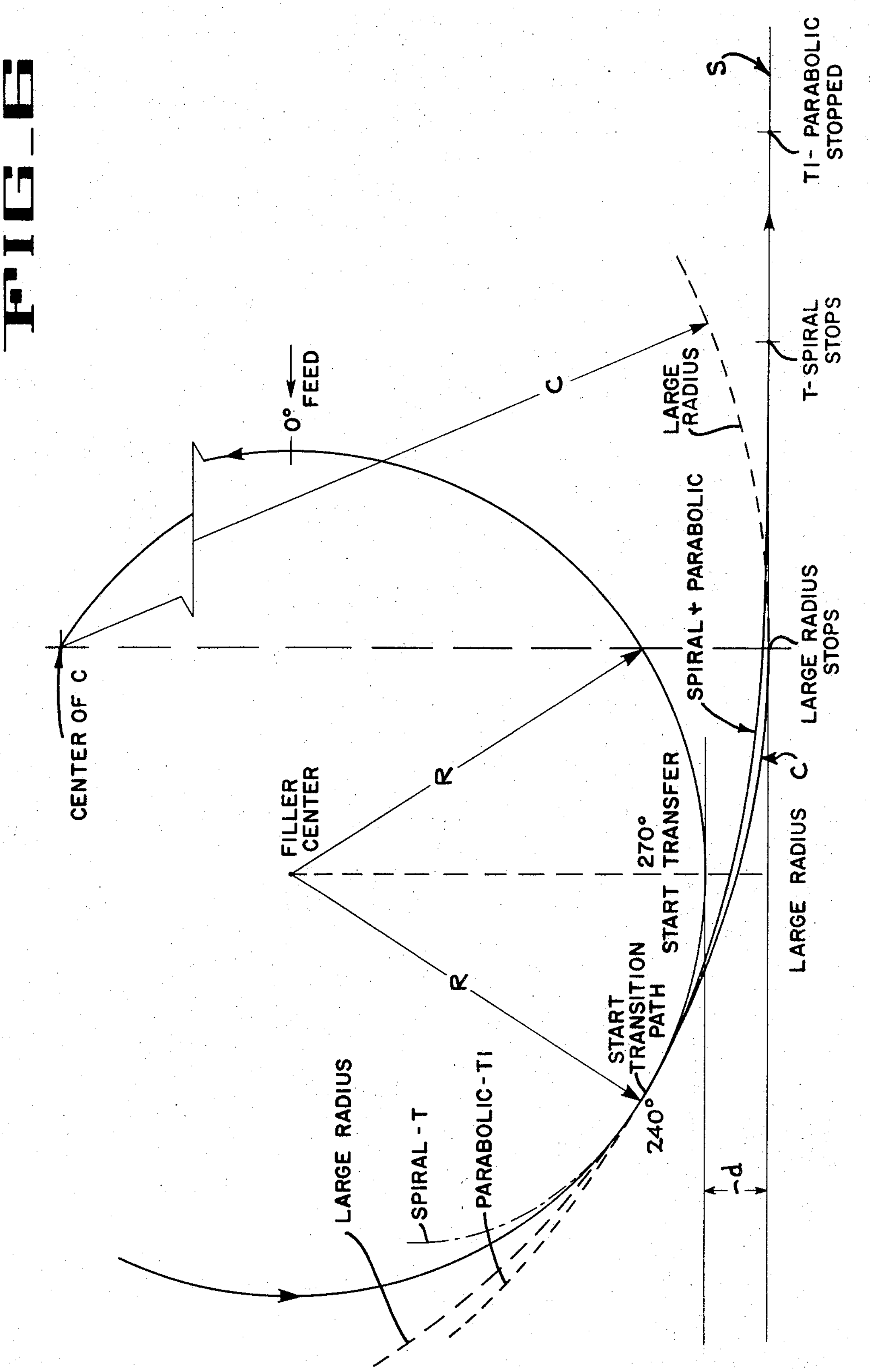
FIG. 6 is a geometric diagram comparing three transition paths.

FIG. 6 is a schematic diagram, presented at the outset to provide a graphic, qualitative comparison of two transition paths T and T1 embodying the present invention with a constant radius of curvature transition path C. At the outset it should be pointed out that without unduly exaggerating the geometry of the paths, they superficially appear to resemble one another quite closely. In fact, inspection of the constant radius path C by one not familiar with the results of attempting to employ this type of path for high speed filling; would lead one to believe that the path provides a smooth enough transition. However, and as was previously pointed out, such superficial resemblances are illusory. Surprisingly small geometric deviations from the curves of the present invention result in acceptable filler operation at high speeds.

Operational Comparisons

As stated surprisingly small geometrical deviations from the paths of the present invention result in inoperable filler operations at high speeds. In FIG. 6, a radius R of the curved filling path of a rotary filler of the type described is struck from the filler center. It will be assumed that around the filling path having radius R the empty cans are introduced at a point labeled zero degrees, which represents the feed position. The transition paths start at roughly 240° and transfer from the fingers making up the pockets in the filler wheel to the fingers 98 of the straight line discharge conveyor 90 (FIGS. 1 and 3) occurs at about 270° which, as can be seen in FIG. 6, is about the maximum offset position that can take place before the fingers forming the can pockets 53 in the pocket 52 (FIG. 1) lose control of the containers.

In FIG. 6, only a single constant circular transition large radius path C is illustrated, because the deficiencies of such a path are such as to prevent high speed operation of the type characterized by the present invention, and the mere break down of one large radius of curvature circular path into two circular paths of successively greater radii dimensions does not solve these problems to any substantial or practical degree. This is because when one, two or even more circular arcs are employed instantaneously abrupt changes in curvature are always provided at two, three or more points along the path.

In FIG. 6, the straight line discharge path S is shown offset from the circular filler path having radius R by an offset distance $d$ previously defined. In practice, given a filler having a certain number of pockets, e.g., 20, 30, 44 pockets, etc., the maximum offset distance $d$ is determined by the physical geometry of the filler pocket wheel. Of course, the distance $d$ cannot be so great as to prevent smooth transfer at the transfer point, which is roughly at 270° in FIG. 6. On the other hand, the distance $d$ should be maximized under the present invention (for a given filler) to provide the maximum length of transition path and hence to minimize the change in curvature of that path along its length, and which also provides maximum length of transition path and hence to minimize the change in curvature of that path along its length, and which also provides maximum time for banking removal. At this point it should be noted that when the single term "curvature" is used in this specification and when used in the claims, it is used in the mathematical sense as being equal to the reciprocal of the radius of curvature of the path at any given point. Thus, a smooth transition path, having its smaller radius at the beginning thereof and a larger radius at the end thereof, when described in terms of the term "curvature" can be defined as being a path wherein the curvature decreases which, of course, corresponds to an increase in the radius of curvature of the path at selected points therealong.

Figure 7:
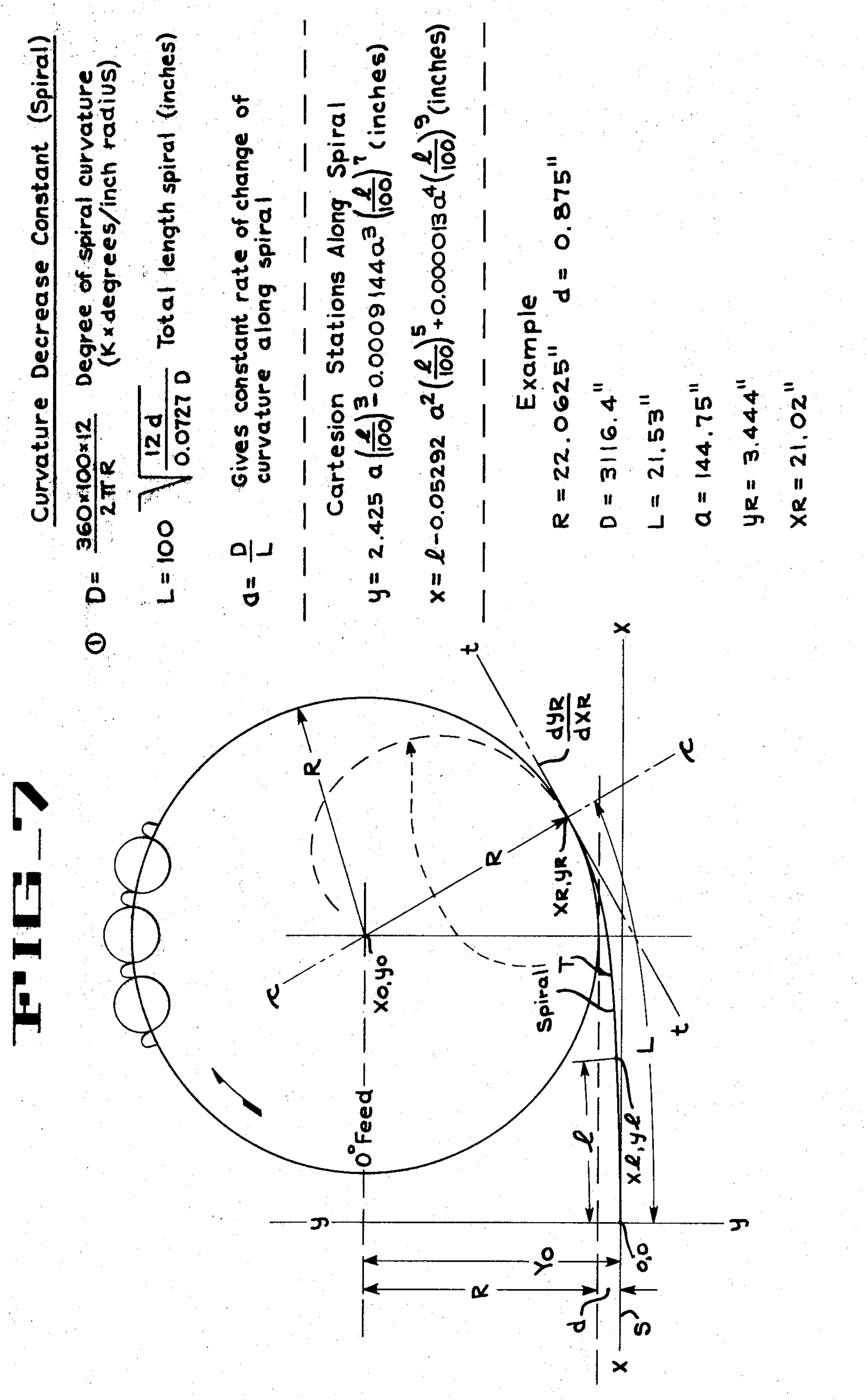
FIGS. 7 and 8 are diagrams incorporating formulas of a constant curvature decrease spiral and a parabolic transition path.
Figure 8:
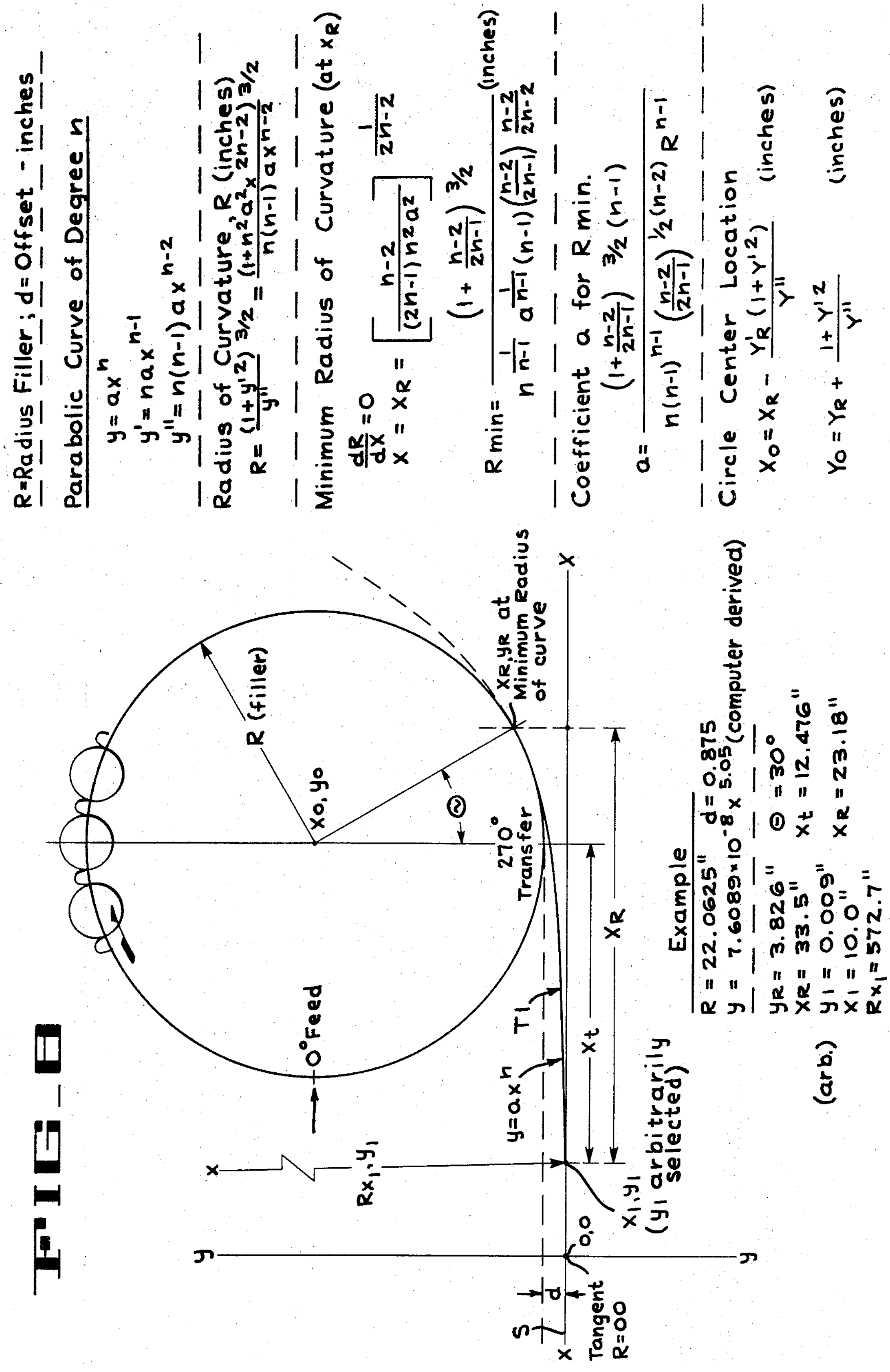

In FIG. 6, all three transition paths C, T and T1 are assumed to start at the same point on the filler path radius R, indicated at "start transition path." The details of the spiral path T of the present invention are given on FIG. 7, both generally and in a specific example; as are those of the parabolic path T1 in FIG. 8.

It will be noted that the spiral path T (extended) starts from a smaller radius than that of the filler path R. It has a smoothly increasing radius (constantly decreasing curvature) but is so selected under the given conditions of filler radius R and offset $d$ that the radius of curvature of the spiral path T is equal to the filler path radius R and tangent to the filler path at the start of the transition path. The spiral path T ends at some point along the straight line discharge path S by which time its curvature is zero, that is, it has an infinite radius of curvature.

The parabolic transition path T1 of the present invention also has a smooth decrease in curvature but it does not have a perfectly constant decrease in curvature along its length. The curve T1 (extended) does not include a section of smaller radius than radius R of the filler center as in the case of the spiral path T. Rather, the parabolic path T1 has a minimum radius which radius is selected to be equal to the radius R of the filler path. The curve T1 is positioned so that its minimum radius is tangent to the filler path radius R. The parabolic path T1 stops along the straight discharge path S at a point downstream of the ends of paths C and T. Its radius of curvature at the straight line path S is so great as to be infinite, within practical limits, the terminus being selected so that there is no practical need for utilizing the remaining portion of the parabolic curve, which for practical purposes is straight.

Constant Decreased Curvature Spiral Transition Path

FIG. 7 is a schematic diagram, along with basic formulas and a specific example, showing a transition path T that meets the aforesaid conditions of high speed filling. The path T is a selected portion of a constant curvature decrease spiral. In order to keep the mathematical expressions for the curve as positive as possible, it will be noted that the curve is in a different quadrant from that of the diagram of FIG. 6.

A radius R for the filler path is given (22.0625 inches in the specific example) as is the offset distance $d$ (0.875 inches in the example), as determined by the physical construction and geometry of the filler and conveyors employed, as previously explained. The spiral discharge path T as previously described, and as shown in FIG. 7 is one which has zero curvature (infinite radius of curvature) at the point $x = 0$, $y = 0$in the Cartesian coordinates, and which has a radius of curvature equal to the radius R of the filler path at the point of tangency of these two curves, $x_r$, $y_r$. It will be noted in this curve that the radius of curvature R of the spiral at the point of tangency of the spiral with the filler path is not the minimum radius of the spiral but is some intermediate radius of the complete spiral curve. Mathematically, the properties of the curve T along its length are investigated at a distance $l$ along its length at any point as $xl$, $yl$ in Cartesian coordinates.

In fitting the curve T to the filler circle R, the slope of the spiral, that is the tangent $t$-$t$, is determined at the selected tangent point $x_R$, $y_R$ and the curve is fitted so that this tangent is perpendicular to a radius R of a filler having its center at coordinates $xo$, $yo$, by conventional mathematical manipulation.

Given on FIG. 7 are the equations for D the degree of spiral curvature, and the total length L of the spiral in inches, based on the given conditions of a filler path radius R and an offset $d$. Also given on the figure are the formulas for the Cartesian coordinates of the curve at any path length L, along the length of the spiral T. Thus the transition path T runs tangentially from the filling circle and terminates tangentially to the straight discharge path. The radius of curvature of the path is equal to that of the filler path R at the start and the path has an infinite radius of curvature at its point of tangency with the straight line discharge path S. The radius of curvature of the spiral increases smoothly along the path up to an infinite radius between these points. Stated differently, the curvature of the path decreases smoothly and at a constant rate from the curvature $K = 1/R$ of the filler path to zero curvature, between the points $x_R$, $y_R$ and 0,0 in terms of the Cartesian coordinates of the curve.

Parabolic Type Transition Path

FIG. 8 is arranged in the manner of FIG. 7 but shows the details of another transition which carries out the principles of the present invention. This curve, T1 is not a constant curvature decrease spiral, as is the curve T, but it does meet the conditions of being tangent to the filler path having radius R at the starting point $x_R$, $y_R$, and having a radius of curvature $R_{x1}$, $y_1$, that is so large at the juncture point $x_1$, $y_1$ with the straight path S, that for all practical purposes the radius of curvature is infinite. Actually the infinite radius curvature is at the point o, o which is some distance down the mathematically precise path.

The parabolic curve T1 is computed to have its minimum radius of curvature at the tangent point $x_R$, $y_R$ with the filler circle and is almost, but not quite tangent to the $x$ axis at some arbitrarily selected point $x_1$, $y_1$. The terminal ordinate (for example) is not quite zero, but actually equals a few thousandths of an inch, and the terminal radius $Rx_1$, $y_1$ in the example is 572.7 inches, the difference between this and a straight line being less than the limits of precision machining of the actual track. Thus, the straight path S actually joins the curve T1 at $x_1$, $y_1$ at a curve radius of almost 600 inches, which radius is so large as to cause no spillage problems in the changeover to a straight line.

In this curve, given the radius R and the offset $d$ a rather complex series of equations must be solved, all of which are indicated on FIG. 8, including the manner of finding the center location of the filler circle $x_o$, $y_o$. Solution of the equations shown in FIG. 8 requires a series of approximations, which can best be performed by a digital computer. It will be noted that in the specific example given in FIG. 8, the general equation for the parabolic curve includes an exponent $n$ of something over 5, and the coefficient $a$ is very small. Experiments with actual fillers has shown that with parabolic curves of the type shown in FIG. 8, even when terminated with a very small, arbitrary offset $y_1$ of a few thousandths of an inch between the theoretical point of tengency at the origin o, o and the selected point of tangency at $x_1$, $y_1$, provides an exceedingly effective transition path which accommodates filling speeds that far exceed any of those previously attained without spillage.

Comparative Actions

Figure 9:
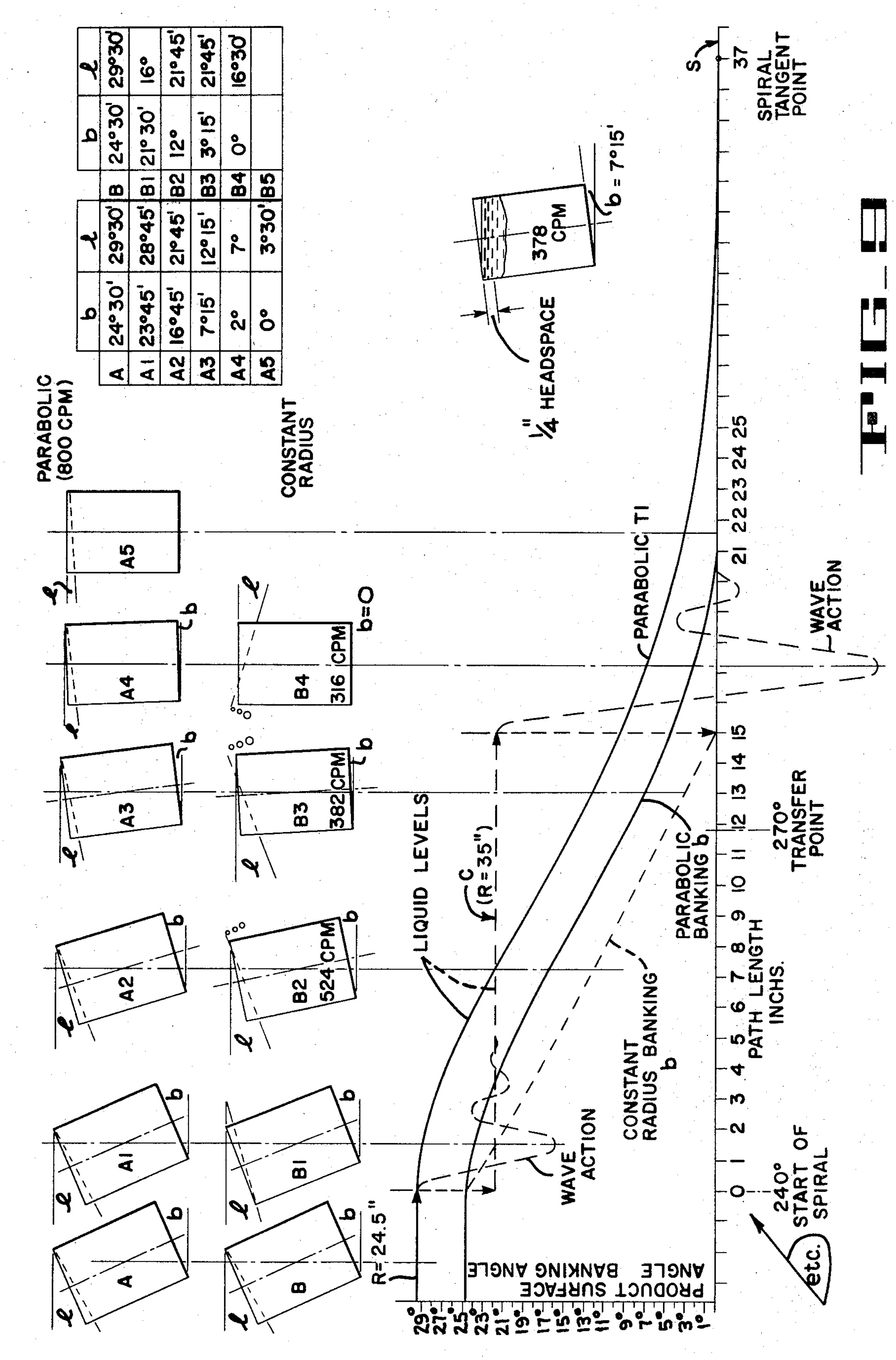
FIG. 9 is an explanatory operational diagram pointing up the advantages of the parabolic type transition path relative to a single, constant radius transition path of the type in the prior art.

FIG. 9 is a schematic operational diagram comparing the actions of a constant radius curve transition path C with a parabolic type path T1 of the present invention. The filler for which these curves were designed is a 28 pocket filler, having a circular filling path radius R of 24.5 inches and an offset $d$ (not shown) of 1.0 inches. The curves have for their abcissa, the Path Length (along the transition path) in inches, and the ordinate is the Product Surface Angle that exists with the banking illustrated at a filling rate of 800 cans per minute (C.P.M.). This corresponds to 28.6 cans/pocket/minute).

It will be assumed that the cans are oil cans having a quarter inch head space which, as shown at the lower right of the figure, means that the cans can be tilted by a banking angle $b$ of 7° 17 min. without spilling. Stated differently, the cans, without banking, can be filled in the filler described at a filling rate of 378 CPM without spillage on a 24.5 inch radius R.

Referring to the constant radius transition curve C in the example given, this circular arc has a radius of 35 inches, although the principles to be explained apply to both larger and smaller radius arcs, none of which work satisfactorily (even when penalized) as compared to the parabolic or spiral curves of the present invention, because of the abrupt changes in curvature at the tangent points. Also the circular arcs provide transition curves (for a given offset $d$) that are shorter than corresponding parabolic type curves under the present invention. The cans come in at a radius R of the filler of 24.5 inches and at the tangent point (0° or 240° on the circle $r$), as can be seen by the dashed lines, the radius necessarily and instantaneously increases from 24.5 to 35 inches and holds constant for about 15 inches along the path. Thereupon the radius increases instantaneously to infinity, that is, the curve C becomes tangent to the straight line discharge path S. The banking angle $b$ for the constant radius curve C is indicated by a straight dashed line which extends over the same path length as that of the constant radius curve. If any substantial banking remains at the end of the transition curve, the wave action effects to be described are aggravated. As shown, the banking decreases progressively and uniformly and there is nothing to be gained by varying from the straight line decrease in banking illustrated in the Figure, because what is gained at one zone must be made up for at another. The Surface Angle of the Product and the Banking Angle are given on the ordinate of the curves.

Referring to specific portions of the constant radius path, conditions at container position B are illustrated as the can comes in at an initial banking angle $b$ of 24° 30 min. It is assumed that the filler is rotating at an 800 CPM filling rate. With a 28 pocket filler of this design the liquid level angle $l$ will be 29° 30 min. as shown in the table at the upper right of the figure.

Can position B1 is a point soon after the can enters the constant radius transition path C. A "wave action" due to the instantaneous transition from a curve of one radius to the curve C of a larger radius is characteristic of this attempt to solve the transition problem, and was explained in the initial statements. In FIG. 9 it will be noted that the wave action in can position B1 has caused the liquid level to decrease sharply from the normally expected level, so that the product surface angle drops to 16°, as shown by the table. This brings the liquid to the inside lip (instead of close to the outside lip which would normally be expected), thereby creating a spilling problem with the banking angle *b* of 21° 30 foot. It must be recognized that the banking angle *b* must be constantly decreased or else enough banking would be left at the end of the transition path to cause spillage and there is nothing to be gained by not decreasing the banking substantially constantly along the transition curve.

The can at position B2 has its banking angle *b* decreased to 12° under the principles outlined above, which is not enough to prevent spillage, because the product surface angle *l* will be, at this time, 21° 45 min. it having been assumed that the wave action previously described has subsided. Calculations will show that conditions at B2 will cause spillage at 800 CPM, and as indicated on the can at B2, the maximum filling rate obtainable without spillage at this point of the transition curve C is only 524 cans per minute.

At can position B3, the containers are approaching the end of the transition path C and the banking angle *b* is decreased to 3° 15 min. Unless the filling rate is no higher than 382 cans per minute the product surface angle *l* of 21° 45 minutes characteristic of the nonwave action performance of the curve C will be sufficient to cause spillage at this point of the transition curve. Failure to remove the banking steadily would merely require removing it later when there is no centrifugal force on the cans and would also aggravate the effect of the terminal "wave action."

Can position B4 shows the effect of the terminal wave action that is generated by the instant increase in the radius of curvature from 35 inches to infinity, at the end of the constant radius transition path C. This wave action, which causes an overtravel of the liquid level in a second attempt to respond to the removal of centrifugal force, is such as to cause severe spillage over the inside lip of the can and in fact, even without the wave action this spillage would occur at the transfer point from the constant radius curve to the straight line path at 316 CPM or higher.

FIG. 9 also shows how the smooth, parabolic-type transition curve T1 of the present transition handles cans at 800 CPM without spillage at any point and without wave action. The same radius 24.5 inches and the same offset *d* of 1.0 inches (not illustratable in the curve) is employed. The banking angle *b* decreases progressively in this design also, from the initial angle of 24° 30 min. as before to 0°, but due to the length of the transition path of the present invention, the banking can be removed before the end of the parab-lic path T1. In the example illustrated, the banking angle *b* is always about 5° less than the product surface angle, a condition that will operate without spillage anywhere along the various paths T1 and S. The table gives the banking and liquid level angles *b* and *l* respectively at various points along the curve and calculations will show that at a filling rate of 800 CPM there is no spillage at any point, although the liquid level approaches (within a reasonable factor of safety) the outer lip of the containers at can positions A, A1, A2, A3, A4 and A5, all as intended.

Banking Decrease

In the example just given to explain the effects of the wave action (FIG. 9) the parabolic curve banking was removed before the end of the parabolic transition curve T1, although the banking was decreased smoothly throughout the curve. In some installations the banking will continue on past the end of the transition curve (either curve T or T1), but even so the banking will be decreased smoothly so as to avoid the production of wave actions caused by decreasing the banking angle.

Parabolic Curve Examples

FIGS. 10 and 10A are charts of 15 parabolic type transition path curves, giving the initial radius R, the offset *d*, the curve radius $Rx_1$, $y_1$ at its juncture with the straight path, and various other values that are illustrated in FIG. 8 of the drawings. It will be noted that the terminal radii are all large, ranging from 180 to 2,000 inches. The formulae of the curves which have the general value of $y = ax^n$ are also shown in FIG. 10 for the various fillers upon which the curves are based. It will be noted that the equations for the curves are rather complex and involve very small numerical coefficient factors for *x* which must be carried out to several decimal places, along with large exponents for *x* which are ranging from 3.3791 (curve No. 10) to 9.4779 (curve No. 15). It has also been found that the exponents n for the unknown *x* must be carried out to at least three decimal points. All of these considerations point up the sensitivity and precision required to formulate these curves, and the fact that a terminal radius can be selected which is not quite infinite, but is practically so, does not relieve one of developing the curves for each filler condition with precision.

Change In Curvature Comparisons

Figure 11:
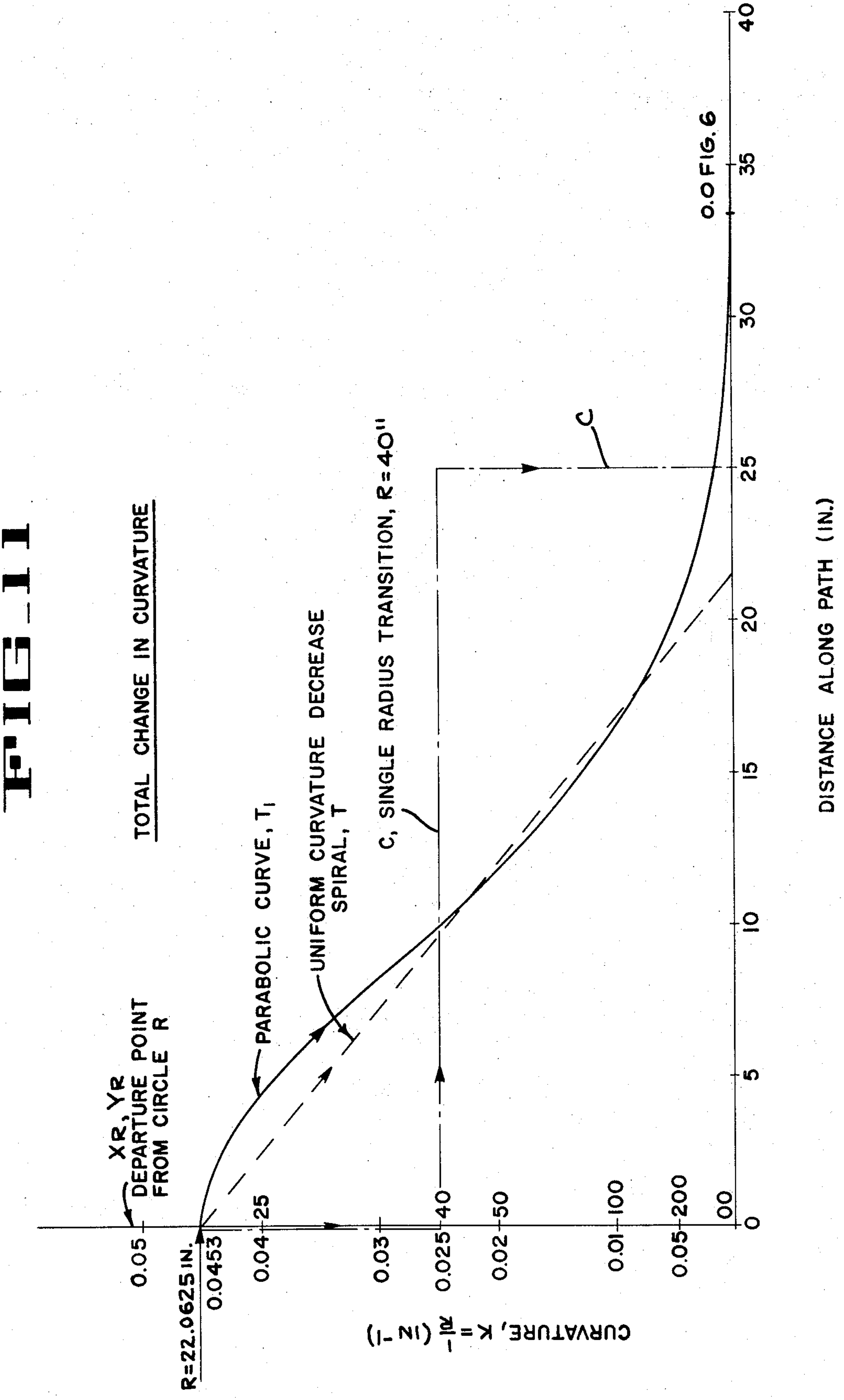
FIG. 11 is a set of curves showing the curvature (inverse radius) and displacement along the path for the single radius transition path, the parabolic type path and the constant curvature spiral path.

FIG. 11 is a Total Change in Curvature plot of three transition curves with a filler radius of 22.065 inches and an offset *d* of seven-eighths inch. These curves correspond to the curves of FIGS. 7 and 8 and in this example, a single radius transition curve C, having a radius R of 40 inches is also plotted. The abcissa of the curve S is the distance along the path in inches and the ordinate is the curvature K, which is equal to the reciprocal of the radius R of the curve at any point therealong. The single radius transition curve C has a curvature K that decreases instantaneously from the initial value of $K = 0.0453$ ($R = 22.0625$ inches) to $K = 0.025$ ($R$ = 40 inches) and then holds constant at the latter figure until it becomes tangent to the straight line transition path S, whereupon the curvature K decreases instantaneously to 0.

The curvature K of the spiral path T decreases uniformly from the initial value of 0.0453 to zero at a point about 22 inches along the path. The curvature K of the parabolic curve T1 starts at the same value as the others and reaches zero at about 33 inches along the path. Both the curves T and T1 will provide filling without spillage at a rate higher than that attainable by the single radius curve C. Furthermore, there is nothing to be gained by breaking up the single radius transiton curve C into a series of tangent circles because this merely introduces more instantaneous or abrupt changes in radius and does not solve the problems to which high speed fillers are singularly sensitive.

Rate Of Change Of Curvature

Figure 12:
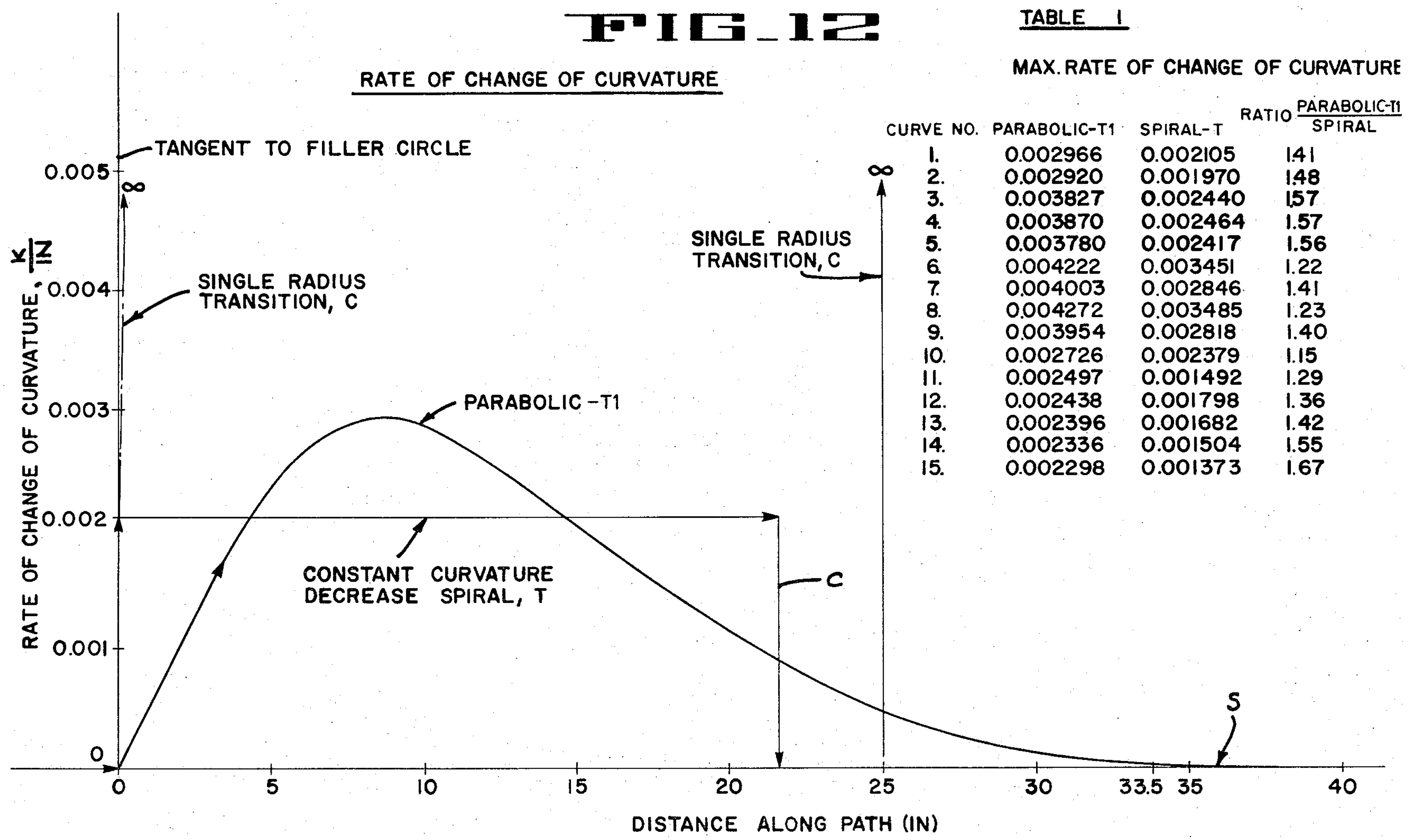
FIG. 12 is a replot of the curves of FIG. 11 based on the rate of change of the curvature of the paths and including a table showing critical comparison values of these paths for purposes of design.

In order to further evaluate the relationship of the two types of transition paths T and T1 featured under the present invention to enable those skilled in the art to practice the invention, the curves of FIG. 12 are presented. In these curves, the abcissa is the same as before but the ordinate is now the derivative of the curvature; namely the Rate of Change of Curvature K at each point along the path. The single radius transition curve C has an infinite rate of change of curvature at the initial tangent point with the filling path R, where the path distance is zero, and another infinite rate of change of curvature at about 25 where the curve C becomes tangent to the straight line path S.

The constant curvature decrease spiral T, has under the conditions given a constant rate of change of curvature of about 0.002, dropping to zero at the straight line path. The significance of an instantaneous change of 0.002 in the rate of change of curvature relative to the physical operation of the filler is not readily mentally evaluated, but this very small change in rate of change at the start and at the end of the curve T has no ascertainable effect on the liquid.

The parabolic spiral curve T1 has an initial rate of change of the curvature of zero at the filler circle, increases to a maximum along the path to a value of about 0.003, and then decreases to zero again at about 33.5 inches. The areas under all of these curves must be the same and nothing is to be gained by attempting to improve one part of the basic curve because what is gained by doing so in one part of the curve is merely lost by a compensating change in the other part that is necessary to equalize the areas. The curves can be evaluated by using the spiral curve T as a standard and by computing the ratios of the maximum rate of change of curvature of the spiral curve T with that of the corresponding parabolic curve T1. Table I on FIG. 12 gives these ratios for T1/T the 15 parabolic type curves of FIGS. 10 and 10A. For example, in the curves shown specifically in FIG. 12, this ratio is 1.41, as also seen in Table I for curve No. 1.

It can be seen from the table that the maximum ratio of the rates of change in curvature T1/T of the two curves is almost 1.7 (curve No. 15), based on the data which is given in FIGS. 10 and 10A. Thus, in designing a transition path, although a constant curvature decrease spiral curve T can be employed as the basic, acceptable type curve, and although deviations from the spiral curve can be formed with parabolic-type curves T1, such deviations from the spiral curve, due to the conditions previously described, will substantially fall within the ratios given in Table I on FIG. 12.

Having completed a detailed description of how to design transition curves for various filler conditions that will provide a smoothly increasing radius of curvature (progressive decrease in curvature) from the point wherein the transition curve departs from the filler path radius R to its junction with the straight line discharge path S, it will be seen that under the present invention, directions are given for designing a filler that is capable of operational speeds heretofore unattainable without spillage. It has also been shown how the banking can be most expeditiously provided by way of an example (FIG. 6). It will be further understood that if automatic banking is desired to still further augment the desirability of operation when the machine is starting or stopping, the teachings of the aforesaid United States copending application of Gellatley et al. can be employed.

Although the best mode contemplated for carrying out the present invention has been herein shown and described, it will be apparent that modification and variation may be made without departing from what is regarded to be the subject matter of the invention.

We claim:

1. In a container filling machine of the type comprising a horizontal plane turret having pockets for advancing containers around a horizontal plane filling path that comprises a substantially circular arc, and filling valves on said turret above the pockets, means forming a substantially straight discharge path offset from said filling path, means forming a curved transition path running tangentially from said filling path and terminating tangentially with said straight discharge path, guide means for confining the containers for motion along said paths, and means for smoothly advancing containers leaving said pockets along said transition and discharge paths; the improvement wherein the radius of curvature of said transition path equals that of said filling path at the junction of said paths, said radius of curvature of the transition path increasing smoothly up to a substantially infinite radius at the junction of said transition path with said straight discharge path.

2. The machine of claim 1, comprising means for banking the containers around said filling path and means for also banking the containers around said transition path, said banking means smoothly decreasing the banking action on the containers as they move along the transition path.

3. The machine of claim 2, wherein the banking angle provided by said banking means is less than the banking angle required to completely counteract the effect of centrifugal force on the product in a container during normal operation, but is sufficient to prevent spillage during normal operation when a head space remains in a filled container.

4. The machine of claim 2, wherein said smoothly decreasing banking action continues on past the junction of said transition path with the straight discharge path.

5. The filling machine of claim 1, wherein said transition path is a spiral having a constant decrease in curvature along its length.

6. The filling machine of claim 1, wherein said transition path is a parabolic curve expressed in Cartesian coordinates as $y = ax^n$, with its origin at the point of tangency of the transition path with a straight line that is offset from the substantially circular filling path, the positive x axis of the curve being an extension of said straight line and with the coefficient $a$ and the exponent $n$ selected to provide a minimum radius of curvature of the exponential curve forming the transition path equal to the radius of said filling path at the junction of the latter with said transition path.

7. The machine of claim 6, wherein the straight line discharge path is offset from said straight line by no more than a few thousandths of an inch.

8. The machine of claim 6, wherein the coefficient $a$ is substantially less than unity and the coefficient $n$ exceeds 3.

9. In a container filling machine of the type comprising a horizontal plane turret having pockets for advancing containers around a horizontal plane, banked filling path that comprises a substantially circular arc, and filling valves on said turret above said pockets; means forming a substantially straight discharge path offset from said filling path, means forming a curved transition path running tangentially from said filling path and terminating tangentially with said straight discharge path, guide means for confining the containers for motion along said paths, and means for smoothly advancing containers leaving said pockets along said transition and discharge paths; the improvement wherein the curvature of said transition path equals that of said filling path at the junction of said paths, the curvature of said transition path decreasing smoothly to substantially zero curvature at said straight discharge path; said transition path having a shape such that the area under the curve represented by a plot of the rate of change of curvature of said transition path against the distance along the path over the length of the path is equal to the area thus obtained when the rate of decrease in curvature of the transition path is constant along its length, as in the case where the path is a constant curvature decrease spiral; the ratio of the maximum rate of change of curvature of the transition path along its length to the rate of change of curvature of a transition path having a constant rate of decrease in curvature along its length not substantially exceeding the value of 1.7.

10. The filling machine of claim 9, wherein said transition path is a parabolic type curve expressed in Cartesian coordinates as $y = ax^n$, with its origin at the point of tangency of the transition path with a straight line that is offset from the filling path, the positive $x$ axis of the curve being an extension of said straight line and with the coefficient $a$ and the exponent $n$ selected to provide a minimum radius of curvature of the exponential curve forming the transition path equal to the radius of said filling path at the junction of the latter with said transition path.

11. The filling machine of claim 9, wherein coefficient $a$ is substantially less than unity and the exponent $n$ in the expression exceeds the value of 3.

12. The machine of claim 9, comprising means for banking the containers around said filling path and the transition path, said banking means smoothly decreasing the banking action along the transition path.

13. The method of filling containers and discharging them wherein the containers are filled around a substantially circular filling path, the filled, moving containers are synchronously picked up from the substantially circular filling path, transferred to a transition path of larger radius and thereafter transferred to and advanced along a straight line discharge path offset from said substantially circular filling path; the improvement comprising the steps of smoothly reducing the centrifugal force acting on the containers from the maximum value at the junction of the filling path with the transition path to zero centrifugal force at the straight line discharge path, there being no instantaneous reduction in said centrifugal force during either of said transfer steps nor along the transition path.

14. The method of claim 13, wherein the containers are banked around said filling path; the improvement comprising smoothly decreasing the banking of the containers from its maximum value along the filling path to a smaller value along said transition path.

* * * * *